United States Patent [19]

Yamazaki

[11] 4,224,670
[45] Sep. 23, 1980

[54] TRACER CONTROL SYSTEM

[75] Inventor: Etuo Yamazaki, Hachioji, Japan

[73] Assignee: Fujitsu Fanuc Limited, Hino, Japan

[21] Appl. No.: 953,210

[22] Filed: Oct. 20, 1978

[30] Foreign Application Priority Data

Mar. 23, 1978 [JP] Japan .................................. 53-33398

[51] Int. Cl.³ ........................ G06F 15/46; G05B 19/42
[52] U.S. Cl. .................................... 364/474; 318/571; 318/578
[58] Field of Search .............. 364/474, 475, 120, 107; 318/571, 578, 567, 570, 1.62; 82/18, 19; 90/13.4, 13.5, 13 B, 62 R; 51/165.71; 409/67, 79, 80

[56] References Cited

U.S. PATENT DOCUMENTS

| | | | |
|---|---|---|---|
| 3,559,021 | 1/1971 | Bingham, Jr. | 318/578 X |
| 3,609,322 | 9/1971 | Burnett et al. | 318/578 |
| 3,875,382 | 4/1975 | Cutler | 364/474 X |
| 3,916,571 | 11/1975 | Seidel | 318/578 X |
| 3,976,928 | 8/1976 | Wenzel | 318/578 |

*Primary Examiner*—Joseph F. Ruggiero
*Attorney, Agent, or Firm*—Staas & Halsey

[57] ABSTRACT

A tracer control system in which data defining a tracing operation is inputted from an input device and stored in a memory, and the stored data is read out by a processor to control the tracing path of a tracer head. Tracer machining is achieved in accordance with a displacement signal derived from a tracer head which traces the surface of a model.

7 Claims, 4 Drawing Figures

TRACER CONTROL SYSTEM

BACKGROUND OF THE INVENTION

1. Field of the Invention

This invention relates to a tracer control system which enables arbitrary setting of the tracing path of a tracer head.

2. Description of the Prior Art

In conventional tracer control systems, limit switches are provided for defining the tracing path of a tracer head, for example, the range of tracing in the x-y plane. The limit switches are actuated by the movement of a tracing machine, by which a predetermined pick feed is carried out and then the direction of tracing is reversed, thus performing the tracing operation. By repeating such operations to trace a model with a stylus of a tracer head, a workpiece is machined. Accordingly, the positions of the limit switches must be adjusted in accordance with the size of the model, and the limit switches are mechanically actuated, so that the reliability of the tracing operation is relatively low.

SUMMARY OF THE INVENTION

This invention is to provide a tracer control system which is free from the abovementioned defects of the prior art and in which data for a tracing operation is previously inputted and stored in a memory to control the tracing path and in which the tracing path can be set, as desired, in accordance with a change in input data.

Briefly stated, in the tracer control system of this invention, data defining the tracing operation is inputted from an input device and stored in a memory, and the stored data is read out by a processor which controls the tracing path of a tracer head tracing a model. The tracing operation can be changed by modifying the stored data in the memory. Data defining the tracing operation, which is obtained by a manual feed, can also be stored in the memory.

DESCRIPTION OF THE PREFERRED EMBODIMENTS

Figure 1:
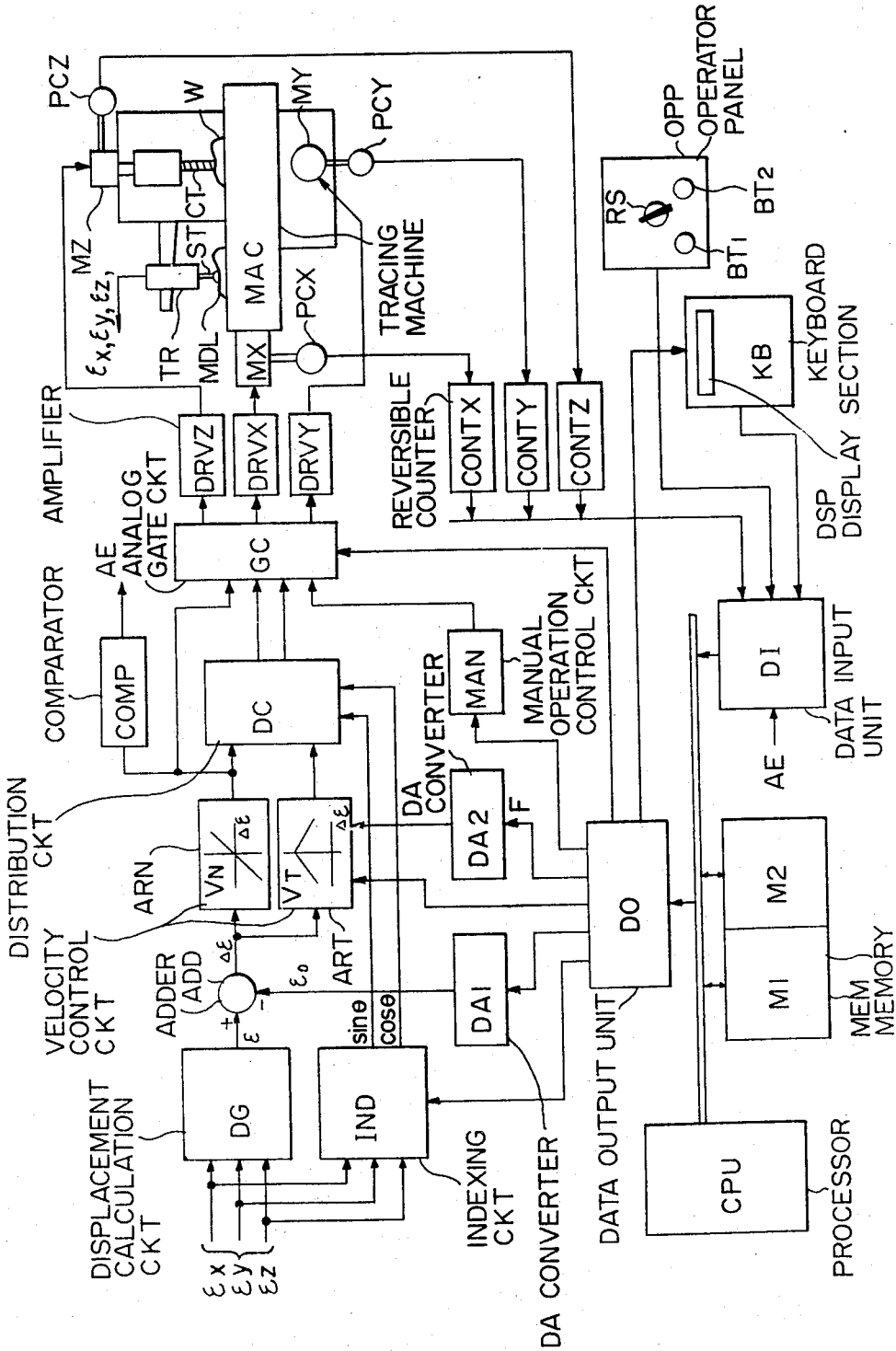
FIG. 1 is a block diagram illustrating an embodiment of this invention.

FIG. 1 illustrates in block form an embodiment of this invention. Reference characters DG and IND respectively indicate a displacement calculation circuit and an indexing circuit which are both supplied with displacement signals $\epsilon_x$, $\epsilon_y$ and $\epsilon_z$ derived from a tracer head TR; ARN and ART designate speed control circuits; ADD identifies an adder; DC denotes a distribution circuit; COMP represents a comparator; GC shows an analog gate circuit; DRVX, DRVY and DRVZ refer to amplifiers; MX, MY and MZ indicate servomotors; PCX, PCY and PCZ designate position detectors; MDL identifies a model for machining; ST denotes a stylus; CT represents a cutter; W shows a workpiece; MAC refers to a tracing machine; CONTX, CONTY and CONTZ indicate reversible counters each of which counts pulses from each of the position detectors PCX, PCY and PCZ to indicate the current tracer head position; MAN designates a manual operation control circuit; OPP identifies an operator panel; RS denotes a setting dial for the tracing speed, etc.; BT1 and BT2 represent push buttons; KB shows a keyboard; DSP refers to a display unit; DI indicates a data input unit; MEM designates a memory composed of a data memory M1 and a control program memory M2; DO identifies a data output unit; CPU denotes a processor; and DA1 and DA2 represent D-A converters.

In accordance with displacement of the stylus ST held in contact with the model MDL, the displacement signals $\epsilon_x$, $\epsilon_y$ and $\epsilon_z$ from the tracer head TR are applied to the displacement calculation circuit DG and the indexing circuit IND to derive therefrom a composite displacement signal $\epsilon = \sqrt{\epsilon_x^2 + \epsilon_y^2 + \epsilon_z^2}$ and displacement direction signals $\sin \theta$ and $\cos \theta$, respectively. The composite displacement signal $\epsilon$ is provided to the adder ADD to obtain a difference $\Delta\epsilon$ between the signal $\epsilon$ and a reference displacement signal $\epsilon_0$. The output from the adder ADD is supplied to the velocity control circuits ARN and ART to produce a reference direction speed signal $V_N$ and a tangential direction speed signal $V_T$, respectively. The output signals $V_N$ and $V_T$ from the speed control circuits ARN and ART are both applied to the distribution circuit DC to derive therefrom command speed signals based on the displacement direction signals $\sin \theta$ and $\cos \theta$ supplied from the indexing circuit IND. The command speed signal is applied to the analog gate circuit GC and then provided to that one of the amplifiers DRVX, DRVY and DRVZ which is selected by the analog gate circuit GC. The servo motors MX, MY and MZ are selectively driven in response to the command speed signal to operate the cutter CT and the tracer head TR together. Since the abovementioned operation is well-known in the art, no detailed description will be given.

In this invention, data for the tracing operation is inputted from the keyboard KB and stored in the memory MEM, from which the stored data is read out as the tracing operation proceeds, thereby controlling the tracing path. Thus, this invention dispenses with limit switches, which are required in the prior art, and permits easy setting and modification of the tracing path. By way of example, the input data may be such as shown in the following table.

TABLE 1

| Item | Symbol | Code |
| --- | --- | --- |
| Mode | (Refer to table 2) | A01 |
| Reference displacement value | $\epsilon_o$ | A02 |
| Approach axis | X, Y, Z | A03 |
| Approach direction | +, − | A04 |
| Approach speed | $V_{AP}$ | F1 |
| Tracing direction | +, − | A05 |
| Tracing speed | $V_{TF}$ | F2 |
| Pick feed direction | +, − | |
| Pick feed speed | $V_{PF}$ | F3 |
| Pick feed value | P | A06 |
| Tracing stroke limit | $L_P$ | X1 |
| Tracing stroke limit | $L_N$ | X2 |
| Tracing control end | $L_{TE}$ | Y1 |
| Automatic return | ON, OF | A07 |
| Automatic return speed | $V_{AR}$ | F4 |
| Automatic return position | $L_{RP}$ | Z1 |

TABLE 2.

| | Mode | Submode |
|---|---|---|
| 1 | Manual tracing | |
| 2 | Forward/reverse scan tracing | 45 degree tracing |
| 3 | Partial contour tracing | |
| 4 | 360 degree contour tracing | Axial pick feed<br>Z-axis pick feed |
| 5 | Partial contour tracing | |
| 6 | 3-dimensional tracing | |

Figure 2:
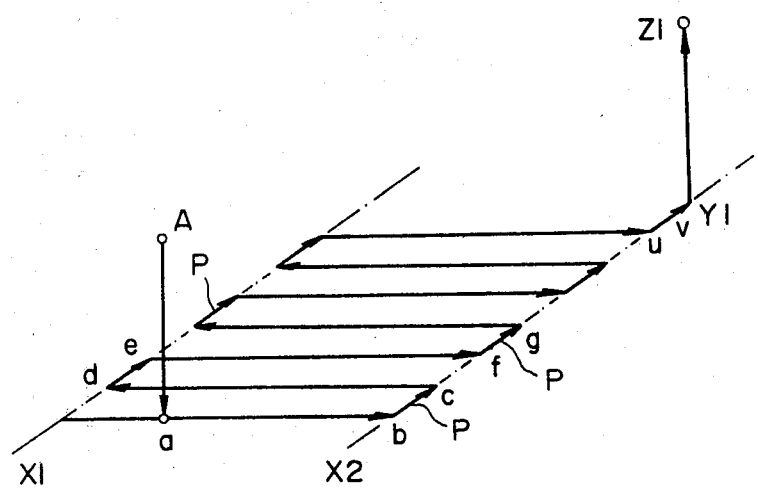
FIG. 2 is a schematic diagram explanatory of an example of a tracing path.
Figure 4:
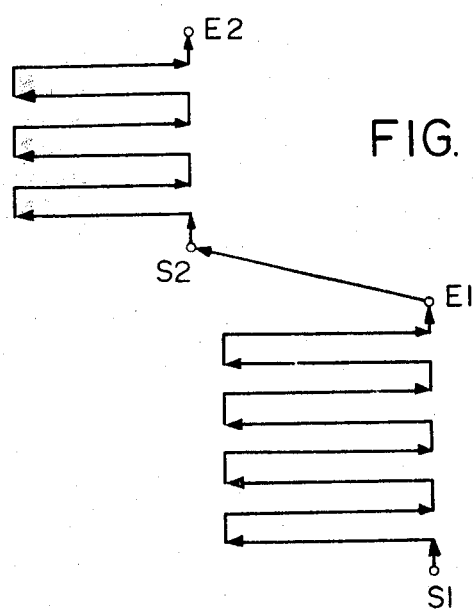
FIG. 4 is a schematic diagram explanatory of the tracing path in another embodiment of this invention.
Figure 3:
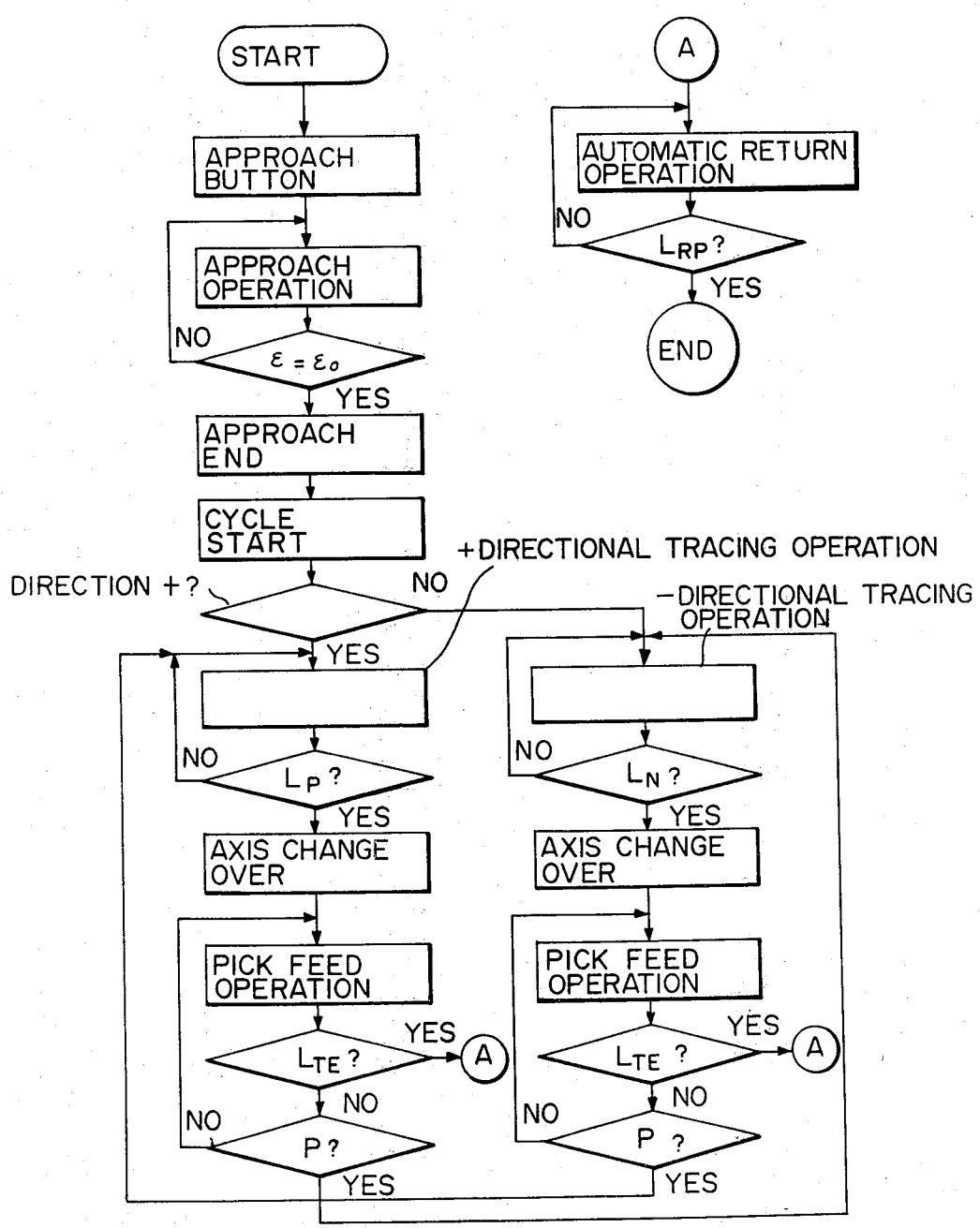
FIG. 3 is a flowchart explanatory of the operation of the embodiment of this invention.

In the case of achieving such a tracing operation as shown in FIG. 2 in which the tracing operation starts from the point A towards the point a and proceeds via the route [a-b-c- . . . u-v], with the tracing stroke limit $L_P=X1, L_N=X2$, the pick feed value $=P$, the tracing control end $L_{TE}=Y1$ and the automatic return position $L_{RP}=Z1$, and then the tracing operation is automatically returned from the tracing control end Y1 to the position Z1, control is performed in accordance with the flow-chart shown in FIG. 3.

Upon depression of an approach button (not shown), the processor CPU reads out data of the approach axis, the approach direction and the approach speed from the memory MEM to apply a signal via the data output unit DO to the analog gate circuit GC to actuate the amplifier DRVZ, causing the servo motor MZ to lower the tracer head TR and the cutter CT. The lowering speed of the tracer head TR and the cutter CT can be determined by data supplied via the data output unit DO to the D-A converter DA2.

Before the stylus ST is lowered into contact with the model MDL, the deflection signals $\epsilon_x$, $\epsilon_y$ and $\epsilon_z$ are zero, so that the difference signal $\Delta\epsilon$ remains equal to the nominal deflection signal $\epsilon_0$. When the stylus has been brought into contact with the model and the signal $\epsilon$ has become equal to the reference displacement signal $\epsilon_0$, the comparator COMP detects that $\Delta\epsilon=0$, and provides an approach end signal AE to the data input unit DI. When the processor CPU has read the approach end signal AE to detect completion of the approach, the tracing operation is initiated.

Upon starting of the tracing operation, the processor CPU reads data of the tracing mode, the reference displacement value, the tracing direction and the tracing speed to start tracing control. The reference displacement data is converted by the D-A converter DA1 into the reference displacement signal of an analog form for input to the adder AND. The servo motor MX is driven in the direction dependent upon the tracing direction data. The processor CPU also reads out the tracing stroke limits $L_P$ and $L_N$ from the memory MEM to compare them with the content of the reversible counter CONTX indicating the current position of the stylus ST.

For instance, in a one-way tracing operation, when the content of the reversible counter CONT X is equal to the tracing stroke limit $L_N$, the axis is switched, and the processor CPU reads data of the pick feed direction, the pick feed rate and the pick feed value P to control the pick feed. When the content of the reversible counter CONT Y has become equal to the pick feed value P after starting of the pick feed, the processor CPU achieves a tracing return operation, i.e. tracing in the + direction. Further, the processor CPU reads the tracing control end position $L_{TE}$ to detect whether or not the tracing has reached there during the pick feed operation.

If it is detected that the tracing has reached the tracing control end position $L_{TE}$ during the pick feed operation, the processor CPU reads out the data of the automatic return, the automatic return speed and the automatic return position $L_{RP}$ from the memory MEM, and based on the data of the automatic return being ON, the servo motor MZ is driven, and when the content of the reversible counter CONTZ becomes equal to the value of the automatic return position $L_{RP}$, the tracing control is completed.

The data of the tracing stroke limits $L_P$ and $L_N$, the tracing control end position $L_{TE}$, the automatic return position $L_{RP}$ and the pick feed value P, mentioned above, need not always be inputted from the keyboard KB but may also be set in the memory MEM. That is, the contents of the reversible counters actually obtained in the case of tracing in the manual feed mode are set in the memory MEM.

Also it is possible to rewrite the data of the memory MEM during the tracing operation. In other words, the tracing path can be modified at any time. The rewrite is achieved, for example, by modifying input data from the keyboard KB which is read and displayed on the display unit DSP. Thus, the pick feed start position, that is, the tracing stroke limit $L_P$ or $L_N$, can be easily changed. In the case of changing the tracing speed, the push button BT1 on the operator panel OPP is depressed to provide an override and when the tracing speed has been adjusted by the actuation of the setting dial RS to a value which is considered to be optimum for the cutter CT, the push button BT2 is depressed to write the speed data in the memory MEM. Thereafter, the tracing takes place at the newly set speed.

Also in the case of performing partial tracing, for example, from a start point S1 to an end point E1 and from a start point S2 to an end point E2, as shown in FIG. 2, tracing control can be achieved continuously by predetermining the pick feed value and the tracing stroke limits for each area of tracing. Moreover, modes of tracing operation can also be set so that scan tracing is followed by contour tracing.

As has been described in the foregoing, in the present invention, data defining tracing operations, such as shown in Tables 1 and 2, are inputted from the keyboard KB and stored in the memory MEM and then read out therefrom to perform arithmetic operations, decision operations, etc. under the control of the processor CPU, thereby controlling the tracing path. This invention does not require any mechanical limit switches, and hence provides for enhanced reliability in tracing and permits a desired setting of the tracing path. Furthermore, the tracing path can be changed by rewriting the content of the memory MEM during tracing, so that tracer machining can be achieved under optimum conditions.

It will be apparent that many modifications and variations may be effected without departing from the scope of the novel concepts of this invention.

What is claimed is:

1. A tracer control system, for a tracer head which traces the surface of a model and outputs data signals representative of the model traced, in which the tracing direction and feedrate of the tracer head are calculated from said data signals derived from said tracer head, and in which said tracing direction and said feedrate are used to achieve tracing controls; the tracer control system comprising an input device for externally inputting input data defining a desired tracing operation, a memory means, operatively connected to said input device, for storing said input data, and a processor means, operatively connected to said memory means and said tracer head for reading said input data defining a desired tracing operation and for controlling a tracing path wherein the data stored in said memory means includes desired feed rate data and desired position data for defining the desired tracing operation, wherein the data stored in said memory means is modified by rewriting the content of said memory means, and wherein the content of said memory means may be modified during the tracing operation.

2. A tracer control system according to claim 1, wherein when operating in a manual feed mode, the data stored in the memory means includes position data for defining a desired tracing operation, and wherein said position data is manually inputted as current position data.

3. A tracing machine, having a tracer control system and a cutting means for cutting a workpiece, comprising:

data processing means for receiving, storing and outputting data defining a desired tracing operation;

tracer control means, operatively connected to said data processing means, for receiving an output from said data processing means and for providing a plurality of output control signals;

tracing means, operatively connected to said tracer control means and said data processing means, for tracing a model and cutting a workpiece, for providing a plurality of displacement signals to said tracer control means, and for providing a tracer head position signal to said data processing means;

wherein said data processing means comprises:

operator panel means for manually providing an adjusted speed signal for adjusting the speed of said tracing operation;

a data input unit, operatively connected to said operator panel means, for receiving said adjusted speed signal and said data defining said desired tracing operation;

a keyboard means, operatively connected to said data input unit, for manually inputting said data defining said desired tracing operation;

a memory means, operatively connected to said data input unit, for storing said data defining said desired tracing operation and said adjusted speed signal;

a central processing unit, operatively connected to said memory means and said data input unit, for outputting said data defining said desired tracing operation and said adjusted speed signal;

a data output unit, operatively connected to said central processing unit and said keyboard means, for outputting said data defining said desired tracing operation and said adjusted speed signal, said data defining said desired tracing operation including approach axis data, lowering speed data, reference displacement data, approach direction data and approach speed data;

and wherein said tracer control means comprises:

a displacement calculation circuit, operatively connected to said tracing means, for receiving said plurality of displacement signals and for providing a composite displacement signal output;

an indexing circuit, operatively connected to said data output unit and said tracing means, for receiving said plurality of displacement signals and for providing a pair of displacement direction signals at its output;

a first digital to analog converter, operatively connected to said data output unit, for receiving said reference displacement data and for providing a first analog output representative of said reference displacement data;

an adder circuit, operatively connected to said first digital to analog converter and to said displacement calculation circuit, for providing a difference signal output representative of the difference between said composite displacement signal output and said first analog output;

a second digital to analog converter, operatively connected to said data output unit, for receiving said lowering speed data and for providing a second analog output;

a first velocity control circuit, operatively connected to said adder, for receiving said difference signal output and for providing a reference direction speed signal output;

a second velocity control circuit, operatively connected to said adder, said data output unit, and said second digital to analog converter, for receiving said second analog output and said difference signal output and for providing a tangential direction speed signal output;

a comparator circuit, operatively connected between said first velocity control circuit and said data input unit, for providing an approach end signal output to said input unit when said difference signal output equals zero;

a distribution circuit, operatively connected to said first and second velocity control circuits and said indexing circuit, for receiving said reference direction speed signal output, said tangential direction speed signal output, and said pair of displacement direction signals, and for providing command speed signals at its output;

a manual operation control circuit, operatively connected to said data output unit, for providing an alternative manual mode of operation;

an analog gate circuit, operatively connected to said first velocity control circuit, said distribution circuit, and said manual operation control circuit, for receiving said command speed signals and said reference direction speed signal output, and for providing a gated command speed signal output;

first, second and third amplifiers, operatively connected to said analog gate circuit, for receiving said gated command signal output and for providing first, second and third amplified outputs;

and wherein said tracing means comprises:

first, second and third servo motors, operatively connected to said first, second and third amplifiers, respectively, said first, second and third servo motors selectively driven in response to said gated command signal output;

a tracer member, having a tracer head and said cutter means, operatively connected to said first, second and third servo motors, and to said displacement calculation circuit, said tracer head and said cutter means moved by said first, second and third servo members;

first, second and third position detector means, operatively connected to said first, second and third servo motors, respectively, for detecting the position of said tracer head and for providing first, second and third pulse outputs, respectively;

first, second and third reversible counters, operatively connected to said first, second and third position detectors, respectively, and operatively connected to said data input unit, for counting said first, second and third pulse outputs and for providing a current position output to said data input unit, whereby said data defining a desired tracing operation is outputted from said data output unit and said tracer control means controls said tracing means in dependence upon said data defining said desired tracing operation.

4. A tracing machine, having a tracer control system and a cutting means for cutting a workpiece, comprising:

data processing means for receiving, storing and outputting data defining a desired tracing operation;

tracer control means, operatively connected to said data processing means, for receiving an output from said data processing means, and for providing a plurality of output control signals;

tracing means, operatively connected to said tracer control means and said data processing means, for tracing a model and cutting a workpiece, for providing a plurality of displacement signals to said tracer control means, and for providing a tracer head position signal to said data processing means;

wherein said data processing means comprises:

operator panel means for manually providing an adjusted speed signal for adjusting the speed of said tracing operation;

a data input unit, operatively connected to said operator panel means and to said tracing means, for receiving said adjusted speed signal and for receiving said data defining said desired tracing operation;

a keyboard means, operatively connected to said data input unit, for manually inputting said data defining said desired tracing operation;

a memory means, operatively connected to said data input unit, for storing said data defining said desired tracing operation and said adjusted speed signal;

a central processing unit, operatively connected to said memory means and said data input unit for outputting said data defining said desired tracing operation and said adjusted speed signal;

a data output unit, operatively connected between said central processing unit and said tracer control means for providing said data defining said desired tracing operation and said adjusted speed signal to said tracer control means, whereby said data defining said desired tracing operation is outputted from said data output unit and said tracer control means controls said tracing means in dependence upon said data defining the desired tracing operation.

5. A tracing machine as set forth in claim 4, wherein said tracer control means comprises:

a displacement calculation circuit, operatively connected to said tracing means, for receiving said plurality of displacement signals and for providing a composite displacement signal output, wherein said data defining said tracing operation includes approach axis data, lowering speed data, reference displacement data, approach direction data, and approach speed data.

6. A tracing machine as set forth in claim 5, wherein said tracer control means further comprises:

an adder circuit, operatively connected to said data output unit and to said displacement calculation circuit, for providing a difference signal output representative of the difference between said composite displacement signal output and said reference displacement data;

a comparator circuit, operatively connected between said displacement calculation circuit and said data input unit, for providing an approach and signal output to said data input unit when said difference signal output equals zero;

a distribution circuit, operatively connected to said displacement calculation circuit, for providing command speed signals at its output;

a manual operation control circuit, operatively connected to said data output unit, for providing an alternative manual mode of operation;

an analog gate circuit, operatively connected to said distribution circuit, said data output unit, said tracing means, and said manual operation control circuit, for receiving said common speed signals and for providing a gated command speed signal output to said tracing means.

7. A tracing machine as set forth in claim 6, wherein said tracing means comprises:

a tracer member, having a tracer head and said cutter means, operatively connected to said analog gate circuit, for performing a tracing operation and cutting a workpiece;

position detector means, operatively connected between said tracer member and said data input unit, for detecting the position of said tracer head and for providing said tracer head position signal.

* * * * *

UNITED STATES PATENT AND TRADEMARK OFFICE
CERTIFICATE OF CORRECTION

PATENT NO. : 4,224,670
DATED : September 23, 1980
INVENTOR(S) : ETUO YAMAZAKI

It is certified that error appears in the above-identified patent and that said Letters Patent are hereby corrected as shown below:

Col. 1, line 12, "x-y" should be --X-Y--;
       line 26, "abovementioned" should be --above-mentioned--;
       line 55, after "IND" insert --,--;
       line 56, after "tively" insert --,--;
       line 67, "CONTX, CONTY and CONTZ" should be --CONT X, CONT Y and CONT Z--.

Col. 2, line 17, "$Ve_x2+E_y2+E_z2$" should be --$\sqrt{E_x^2+E_y^2+E_z^2}$--;

line 38, "abovementioned" should be --above-mentioned--.

Col. 3, line 51, "AND" should be --ADD--;
       line 56, "CONTX" should be --CONT X--.

Col. 4, line 10, "CONTZ" should be --CONT Z--.

Signed and Sealed this

Tenth Day of March 1981

[SEAL]

Attest:

RENE D. TEGTMEYER

Attesting Officer     Acting Commissioner of Patents and Trademarks